United States Patent [19]
Davis et al.

[11] Patent Number: 5,126,384
[45] Date of Patent: Jun. 30, 1992

[54] SUBSTITUTED POLYBUTADIENE POLYMER AND ROOFING MEMBRANE FORMED THEREFROM

[75] Inventors: James A. Davis, Uniontown; William L. Hergenrother, Akron, both of Ohio; Daniel R. McGillvary, Carmel, Ind.; Joseph K. Valaitis, Brecksville, Ohio

[73] Assignees: Bridgestone/Firestone, Inc., Akron, Ohio; Bridgestone Corporation, Tokyo, Japan

[21] Appl. No.: 721,012

[22] Filed: Jun. 26, 1991

[51] Int. Cl.$^5$ ............................................. C08F 8/22
[52] U.S. Cl. ....................................... 524/71; 514/78; 514/413; 514/572; 525/322.3; 525/332.8; 525/332.9; 525/331.2; 525/356; 525/375
[58] Field of Search .................. 524/71, 78, 413, 572; 525/332.8, 332.9, 332.2, 332.3

[56] References Cited

U.S. PATENT DOCUMENTS

| | | |
|---|---|---|
| 2,831,839 | 4/1938 | Caterino et al. |
| 2,980,656 | 4/1961 | Jones et al. |
| 3,293,226 | 12/1966 | de Schrijver |
| 3,392,161 | 7/1968 | Uelzmann |
| 3,480,609 | 11/1969 | Frew, Jr. |
| 3,714,297 | 1/1973 | Blaise et al. |
| 4,039,706 | 8/1977 | Tajima et al. |
| 4,075,289 | 2/1978 | Falk |
| 4,405,759 | 9/1983 | Jagtap |
| 4,461,875 | 7/1984 | Crepeau |
| 4,636,414 | 1/1987 | Tajima et al. |
| 4,710,554 | 12/1987 | Imai et al. |
| 4,762,744 | 1/1988 | Woiceshyn et al. |
| 4,812,349 | 3/1989 | Muelbeck |

*Primary Examiner*—Bernard Lipman
*Attorney, Agent, or Firm*—Frank J. Troy, Sr.

[57] ABSTRACT

A substituted polybutadiene polymer and a composition containing the polymer which is suitable for use in a flat sheet material such as a roofing membrane is disclosed. The polymer has a superior filler capacity, excellent flame resistivity and acceptable heat aging properties, especially heat aged elongations. The composition, which includes the polymer of the present invention and from about 5 to about 160 parts by weight of a filler material per 100 parts polymer, is self-adhering without the use of an adhesive and is heat seamable to produce seams which are resistant to temperatures as high as 100° C.

15 Claims, No Drawings

SUBSTITUTED POLYBUTADIENE POLYMER AND ROOFING MEMBRANE FORMED THEREFROM

FIELD OF THE INVENTION

The present invention relates generally to a novel polybutadiene polymer which is substituted with halogen; alkoxy; halogen-endcapped, ring-opened cyclic ether and alkoxy-endcapped, ring-opened cyclic ether groups. The present invention further relates to a composition and a heat-seamable, flat sheet material formed from the substituted polybutadiene polymer and filler material.

BACKGROUND OF THE INVENTION

Traditionally, the building industry has utilized conventional built-up asphalt roofing as a preferred material in roofing construction. More recently, however, membrane roofing materials have displaced the conventional materials as a preferred material due to their cold cracking resistance, ease of installation, and overall improved and increased leak protection over time. Further, the membrane systems are easier and safer to install and are therefore more desirable to the contractor as well as the consumer.

Two membrane types are utilized in this field: elastomeric and thermoplastic. Elastomeric membranes, such as vulcanized EPDM, suffer the drawback of requiring an adhesive for seaming the membrane in order to provide a leak-free, continuous roofing cover. These adhesives add a significant material cost to the product and are also expensive, difficult and time-consuming to apply. Further, the adhesives often weaken over time, causing delamination of the membranes and subsequent leaks in the roofing cover. Elastomeric membranes also require an additional costly curing step.

Thermoplastic membranes, such as those formed from polyvinyl chloride (PVC), chlorinated polyethylene (CPE), chlorosulfonated polyethylene and the like, can be heat sealed or solvent welded to provide dependable seals of higher strength; however, these membranes also have serious disadvantages. For example, the thermoplastic material must be plasticized to provide the flexibility necessary for a roofing membrane. Unfortunately, plasticizers are quite expensive and often leach out of the membrane over time due to exposure to the environment. This loss of plasticizer results in the loss of flexibility, embrittlement and decreased cold crack resistance of the membrane, thereby severely shortening its useful life. Further, the capacity of the thermoplastic materials to accept fillers is somewhat limited. As fillers are usually desirable from an economic standpoint as well as advantageous in imparting properties such as flame retardancy, this disadvantage manifests itself in an expensive roofing product with severely limited fire retardancy or other desirable properties.

A strong need therefore exists for a polymer which exhibits the many characteristics necessary and essential for incorporation into a roofing membrane without exhibiting the drawbacks described above.

BRIEF DESCRIPTION OF THE INVENTION

An object of the present invention is to provide a polymer for use in a flat sheet material which is heat seamable and is useful to provide, for example, a roofing membrane or flashing material.

A further object of the present invention is to provide a polymer for use in a roofing membrane which accepts high filler loads.

Another object of the present invention is to provide a polymer for use in a roofing membrane which maintains its plasticity and flexibility over time.

Yet another object of the present invention is to provide a polymer for use in a roofing membrane which exhibits desirable weathering and heat aging properties.

Still another object of the present invention is to provide a composition which is fire retardant, heat seamable and which maintains its plasticity and flexibility over time.

These and other objectives are achieved by the substituted polybutadiene polymer of the present invention as described in more detail below. The substituents attached to the polybutadiene backbone include halogens; alkoxys having an aliphatic group with a carbon chain length of between 6 and 18 carbon atoms; halogen-endcapped, ring-opened cyclic ethers having about 3 to about 15 carbon atoms inclusive and alkoxy-endcapped, ring-opened cyclic ethers having about 3 to about 15 carbon atoms and having an alkoxy endcap including an aliphatic group with a carbon chain length of between 6 and 18 carbon atoms. The composition of the present invention includes the substituted polybutadiene polymer of the present invention and a filler material.

DETAILED DESCRIPTION OF THE PREFERRED EMBODIMENT

The polymer of the present invention is a polybutadiene, preferably 1,4-polybutadiene, which has been substituted at some or all of its ethylenic double bond locations with a substituent selected from the group consisting of:

(a) a halogen, preferably chlorine;

(b) an alkoxy ($-OR_2$) wherein $R_2$ is an aliphatic group having a carbon chain length of between about 6 and about 18, inclusive;

(c) a halogen endcapped, ring-opened cyclic ether of the following structure:

wherein $R_1$ is a ring-opened cyclic ether having about 3 to about 15 carbon atoms, inclusive, and wherein X is a halogen atom; and (d) an alkoxy-endcapped, ring-opened cyclic ether of the following structure:

wherein $R_1$ is ring-opened cyclic ether having about 3 to about 15 carbon atoms, inclusive, and wherein the aliphatic group $R_2$ has a carbon chain length of between about 6 and about 18 carbon atoms, inclusive.

The substituted polybutadiene polymer of the present invention therefore comprises the following groups:

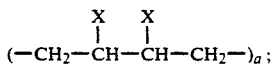

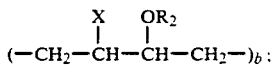

-continued

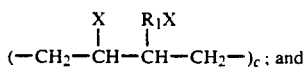

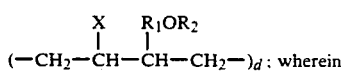

X is a halogen, preferably chlorine;

R$_1$ is a ring-opened cyclic ether having about 3 to about 15 carbon atoms, inclusive;

R$_2$ is an aliphatic group having a carbon chain length of between about 6 and about 18 carbon atoms, inclusive, and preferably between 6 and 9, inclusive, carbon atoms; and a=0.05 to 0.95 mole fraction;
b=0.01 to 0.75 mole fraction;
c=0.01 to 0.95 mole fraction; and
d=0.01 to 0.30 mole fraction; wherein
a+b+c+d=1.00.

Preferably,
a=0.30 to 0.35 mole fraction;
b=0.025 to 0.055 mole fraction;
c=0.50 to 0.60 mole fraction;
d=0.05 to 0.10 mole fraction; and a+b+c+d=1.00.

The polymer of the present invention preferably has a weight average molecular weight of about 200,000 to about 350,000 and an $\overline{M}_w/\overline{M}_N$ of about 1.75 to about 2.50.

The base polymer material utilized in forming the polymer of the present invention is a polybutadiene polymer. The most preferred base polymer is 1,4-polybutadiene having a weight average molecular weight of between about 150,000 and 200,000. The polybutadiene is typically formed by the polymerization of butadiene in the presence of n-butyl lithium in a heated reaction system. The polybutadiene can be formed by any other known or conventional method, such as emulsion polymerization. A suitable base polymer is commercially available as Diene ® 35 manufactured by Firestone Synthetic Rubber Company of Akron, Oh.

In the production of the polymer of the present invention, the base polymer material is dissolved in a solvent mixture consisting of a cyclic ether having about 3 to about 15 carbon atoms. Suitable cyclic ethers include, but are not limited to, tetrahydrofuran (THF), dioxane, trioxane, dioxolane and alkyl-substituted dioxolanes. The preferred cyclic ether is THF. The solvent mixture also includes an alcohol having a carbon chain length of between about 6 and about 18 carbon atoms, inclusive. This solution is then treated with a halogen at a temperature of between about −10° C. and +10° C. The resulting polymer is then isolated by any conventional method, such as alcohol coagulation.

While not intended to be limiting, the following example is illustrative of this process.

EXAMPLE 1

1,4-polybutadiene having a weight average molecular weight of about 200,000 was prepared by reacting 24.98 pounds of 24.0 weight percent butadiene and 11.4 cc of 1.50 M n-butyl lithium for about 16 hours at 49° C. The polymerization was then stopped with isopropanol and the solvent was removed by drying.

A solution was then prepared by dissolving 50 grams of the polymer (37% cis, 54% trans, 9% vinyl) in 500 ml of tetrahydrofuran (THF). This solution was added to a 5 liter, 3-neck flask which had painted black and which was equipped with a stirrer, a fritted glass inlet tube and a condenser. An additional 1300 ml THF was added to bring the total volume to 1800 ml. To this solution was added 384 ml of 1-hexanol (313 g, 3.069 mole) while cooling in an ice bath.

After the solution was cooled to 0° C., 75 g (1.058 mole) Cl$_2$ was liquified in a flask. The flask was attached to the reactor such that as the chlorine evaporated, it was diluted with N$_2$ and added through the fritted glass inlet tube slowly over 1.5 hours. The resulting polymer was then separated by alcohol coagulation, washed, dried and milled.

EXAMPLE 2

The reaction described in Example 1 was duplicated except for a substitution of 3.069 mole octanol for the 3.1 mole hexanol utilized in the previous example.

NMR $^{13}$C spectral analysis of the resulting polymer products from Examples 1 and 2 revealed the results set forth in Table 1 below:

TABLE 1

| Analysis of Substituted Polybutadiene Polymers | | |
|---|---|---|
| | Example 1 (Hexanol, R$_2$ = C$_6$H$_{13}$) | Example 2 (Octanol, R$_2$ = C$_8$H$_{17}$) |
| Yield (grams) | 145.5 | 151.1 |
| (—CH$_2$—CH(Cl)—CH(Cl)—CH$_2$—) (mole fraction) | 0.316 | 0.333 |
| (—CH$_2$—CH(Cl)—CH(OR$_2$)—CH$_2$—) (mole fraction) | 0.051 | 0.029 |
| (—CH$_2$—CH(Cl)—CH(O(CH$_2$)$_4$Cl)—CH$_2$—) (mole fraction) | 0.557 | 0.551 |
| (—CH$_2$—CH(Cl)—CH(O(CH$_2$)$_4$OR$_2$)—CH$_2$—) (mole fraction) | 0.076 | 0.087 |
| $\overline{M}_W$ (g/mole) | 313,000 | 316,000 |
| $\overline{M}_W/\overline{M}_N$ | 2.06 | 1.87 |

Equimolar amounts of other cyclic ethers may be substituted for THF in the above examples. For example, use of either dioxane, trioxane or dioxolane instead of THF would yield a polybutadiene polymer having the following groups:

| Cyclic Ethers | | |
|---|---|---|
| Dioxane | Trioxane | Dioxolane |
| (—CH$_2$—CH(Cl)—CH(Cl)—CH$_2$—) | (—CH$_2$—CH(Cl)—CH(Cl)—CH$_2$—) | (—CH$_2$—CH(Cl)—CH(Cl)—CH$_2$—) |

| | Cyclic Ethers | |
|---|---|---|
| Dioxane | Trioxane | Dioxolane |
| Cl  OR₂<br>\|    \|<br>(—CH₂—CH—CH—CH₂—) | Cl  OR₂<br>\|    \|<br>(—CH₂—CH—CH—CH₂—) | Cl  OR₂<br>\|    \|<br>(—CH₂—CH—CH—CH₂—) |
| Cl  O(CH₂)₂O(CH₂)₂Cl<br>\|    \|<br>(—CH₂—CH—CH—CH₂—) | Cl  [O—CH₂]₃Cl<br>\|    \|<br>(—CH₂—CH—CH—CH₂—) | Cl  OCH₂O(CH₂)₂Cl<br>\|    \|<br>(—CH₂—CH—CH—CH₂—) |
| Cl  O(CH₂)₂O(CH₂)₂OR₂<br>\|    \|<br>(—CH₂—CH—CH—CH₂—) | Cl  [O—CH₂]₃OR₂<br>\|    \|<br>(—CH₂—CH—CH—CH₂—) | Cl  OCH₂O(CH₂)₂OR₂<br>\|    \|<br>(—CH₂—CH—CH—CH₂—) |

The polymer of the present invention may be combined with a filler material to form a composition suitable for use in forming a heat-seamable, flat sheet material such as a roofing membrane. The composition may include from about 5 parts to about 160 parts of the filler material based on 100 parts polymer.

The filler material may be any conventional filler material, including (but not limited to) titanium dioxide, various grades of carbon black, finely ground coal, finely ground mollusk shells, calcium carbonate, silicates, untreated or chemically modified clays, mica, talc, silica, and the like Fillers which impart flame retardancy to the membrane, including antimony trioxide, zinc borate, alumina trihydrate and the like may also be added. The carbon black useful herein is any carbon black. Preferred are furnace blacks such as GPF (general purpose furnace), FEF (fast extrusion furnace) and SRF (semi-reinforcing furnace). These carbon blacks may also be blended with more reinforcing blacks, i.e., HAF, ISAF, SAF and the like. For a complete description of such carbon blacks, see for example, *The Vanderbilt Rubber Handbook*, pp. 408–424, RT Vanderbilt Co., Norwalk, Conn. 06855 (1979 edition). Preferably, the composition of the present invention includes from about 50 parts to about 135 parts filler based on 100 parts polymer. The preferred filler is titanium dioxide.

The composition of the present invention may also contain an effective amount of conventional compounding additives, such as processing aids, UV stabilizers, dispersing agents, flame retardants, and the like. The preferred composition includes 0.25 to 2.5 parts per hundred parts polymer of a fatty acid salt/amide blend commercially available from Struktol Company under the trademark Polydis ®TR-016 as a dispersing agent and from 1 to 5 parts per hundred parts polymer of a substituted benzotriazole commercially available from Ciba-Giegy under the trademark TINUVIN ® 327.

While not intended to be limiting, the following example is illustrative of the composition of the present invention.

EXAMPLE 3

The polymer formed in Example 1 was milled with 125 parts rutile titanium dioxide (TI-PURE ® R-960 available from DuPont) 2.5 parts TINUVIN ® 327 and 0.5 parts POLYDIS ® TR-016. This composition was designated Composition A. The milling produced 45 mil flat sheets. For testing purposes, dumbbell shaped specimens were cut from individual 45 mil flat sheets according to ASTM D-412 (Method A-dumbbell and straight specimens). Modulus, tensile strength at break and elongation at break measurements were obtained using a table model Instron ® Tester, Model 1130, and the test results were calculated in accordance with ASTM D-412. All dumbbell specimens were allowed to set for about 24 hours, following which testing was carried out at 23° C. Shore A hardness testing was conducted at 23° C. in accordance with ASTM Method D-2240.

Tear properties of milled 45 mil flat rubber sheets cut with a die C (90° angle die) were determined in accordance with ASTM Method D-624. Die C tear specimens were not nicked prior to testing. Tear resistance, in 1 bf/inch, was obtained using a table model Instron ® Tester, Model 1130 and the test results were calculated in accordance with ASTM Method D-624. Testing was again carried out at 23° C.

Oxygen index testing was conducted in accordance with ASTM Method D-2863 using a Stanton-Redcroft FTA flammability unit.

A battery of control tests was performed on similarly produced, 45 mil specimens of a composition commercially available as a roofing sheeting material from Sarna Kunststoff AG of Switzerland as SARNAFIL ® PVC.

The results of these tests are set forth in Table 2 below.

EXAMPLE 4

The polymer formed in Example 2 was filled with 45 parts rutile titanium dioxide available from DuPont under the trademark TI-PURE ® R-960, 2.5 parts TINUVIN ® 327 and 0.5 part POLYDIS ®TR-016, based on 100 parts polymer, to form a polymer composition of the present invention. This composition was designated Composition B. A second composition was also formed, designated Composition C, which was identical to the Composition B except that the titanium dioxide level was increased to 100 parts per 100 parts polymer. A battery of tests were conducted to determine a number of physical properties for each rubbery composition utilizing the procedures set forth in Example 3. The results of these tests are tabulated in Table 2 below.

TABLE 2

| Properties at 23° C. - Unaged Dumbbell Specimens | | | | |
|---|---|---|---|---|
| | Control Composition (filled PVC polymer) | Comp. A | Comp. B | Comp. C |
| 100% Modulus, psi | 1145 | 540 | 105 | 205 |
| 200% Modulus, psi | 1575 | 860 | 145 | 335 |
| 300% Modulus, psi | — | 990 | 185 | 470 |
| Tensile at break, psi | 1585 | 1120 | 510 | 815 |

TABLE 2-continued

| Properties at 23° C. - Unaged Dumbbell Specimens | | | | |
|---|---|---|---|---|
| | Control Composition (filled PVC polymer) | Comp. A | Comp. B | Comp. C |
| Elongation at break, % | 205 | 390 | 815 | 560 |
| Tear at 23° C., lbf/in. | 370 | 193 | — | 186 |
| Shore A Hardness (at 23° C., unaged specimens) | 76 | 72 | 48 | 61 |
| L.O.I. Oxygen Index, % O$_2$ | 26 | 26.5 | 23.0 | 24.3 |

EXAMPLE 5

Dumbbell specimens cut in accordance with ASTM D-412 were aged in a forced air over for 28 days at 70° C. in accordance with ASTM D-573. Stress-strain tests as set forth in Example 3 were performed on the aged samples. A 45 mil sample of a mineral-filled PVC control composition available as SARNAFIL ® PVC was aged and also tested at 23° C. The results of these tests are set forth in Table 3 below.

TABLE 3

| Properties at 23° C. - Aged Dumbbell Specimens | | | |
|---|---|---|---|
| | Control Composition (filled PVC polymer) | Composition A | Composition C |
| 100% Modulus, psi | 1400 | 650 | 440 |
| 200% Modulus, psi | — | 1065 | 785 |
| 300% Modulus, psi | — | 1215 | 1060 |
| Tensile at break, psi | 1705 | 1295 | 1290 |
| Retention, % | 107.6 | 115.6 | 158.3 |
| Elongation at break, % | 165 | 335 | 490 |
| Retention, % | 80.5 | 85.9 | 87.5 |

As can be seen from the above data, the compositions of the present invention exhibit higher filler loadings (which result in improved stress-strain properties), equivalent to improved L.O.I. performance and significantly better heat aging properties than the filled PVC compositions.

EXAMPLE 6

A test for peel and shear adhesion was conducted as described below. A composition including 100 parts of the polymer of Example 1 filled with 125 part rutile titanium dioxide, 2.5 parts TINUVIN ® 327 and 0.5 parts POLYDIS ® TR-016, designated Composition D, was milled into 6×6-inch sheets approximately 40 mils in thickness. Scrim-reinforced test pads were formed by inserting a 6×6-inch sheet of PVC-treated polyester scrim between 2 polymer composition sheets, covering the assembly with Mylar ® film, placing the covered assembly in a curing mold, pressing the covered assembly for about five minutes at about 150° C. removing the Mylar ® film, allowing the assembly to cool to 23° C. and heat-seaming the assembly using a Leister hand-held heating gun. One-inch wide test specimens were cut on a clicker machine with a one-inch die. The specimens were tested at a crosshead and chart speed of two inches per minute using a Model 1130 Instron Universal Tester in accordance with adhesion test set forth in ASTM D-413. Peel and shears adhesion strengths were measured at room temperature (23° C.) as well as 70° C. and 100° C.

Control test specimens utilizing a sulfur cured conventional EPDM membrane were seamed using a butyl based, lap splice adhesive commercially available from Uniroyal as SA-1065 were also tested. The control test membrane was a sulfur cured, black EPDM membrane which is commercially available from Firestone Building Products Company and marketed as a RUBBER-GARD ® roofing membrane. The results of these tests are set forth in Tables 4 and 5 below.

TABLE 4

| | Seam Interply Peel Adhesion | | | | | |
|---|---|---|---|---|---|---|
| | PLI* at 23° C. | Type of Failure | PLI at 70° C. | Type of Failure | PLI at 100° C. | Type of Failure |
| Adhesive-Seamed Control | 13 | C | 1.2 | C | 0.85 | C |
| Composition D | >67.5 | A | >56.5 | A | >35 | A |

*Pounds per linear inch

TABLE 5

| | Seam Shear Strength Adhesion | | | | | |
|---|---|---|---|---|---|---|
| | PLI* at 23° C. | Type of Failure | PLI at 70° C. | Type of Failure | PLI at 100° C. | Type of Failure |
| Adhesive-Seamed Control | 27 | C | 11.5 | C | 7.75 | C |
| Composition D | >72.5 | A | >47.5 | B | >28.5 | B |

*Pounds per square inch
Code description - Type of Failure
A - Rubber compound tore to the fabric reinforcement, rubber separated from the fabric
B - Some initial interply failure, then rubber compound tore to the fabric reinforcement, rubber separated from the fabric
C - Interply failure - separation between the two plies In order to demonstrate the seaming ability of the substituted polybutadiene polymer in a filled membrane composition, both peel and shear test specimens were formed using a hand-held heating gun with a heat setting of 10 (peak hot air temperature, 450 ° C.). The seem was formed during the heating process using a metal hand roller and from about 6 to about 8 psi seaming pressure. The hand-held heating gun was manufactured by Leister-Kombi in Switzerland.

As these results indicate, the compositions of the present invention are superior to conventional adhesive-seamed, sulfur cured EPDM membranes in both interply peel adhesion and seam shear strength adhesion at room temperature as well as elevated temperatures of 70° C. and 100° C.

In view of the properties described above, the compositions of the present invention are valuable in the producing of roofing membranes. Roofing membranes formed from the compositions of the present invention may be produced by any method conventionally used for producing roofing membranes from filled polymer compositions. For example, the membranes may be formed by a conventional calendering technique. Other methods, including spray coating and roller die forming may also be used. Roofing membranes formed from the compositions of the present invention may optionally be scrim reinforced.

The embodiments and examples set forth previously are provided to illustrate the spirit and scope of the present invention. It is to be understood that one of ordinary skill in the art can contemplate and make various changes and modifications that do not depart from the spirit and scope of the present invention. For example, other halogens, including bromine and fluorine, as well as higher alcohols may be utilized in forming the polymer of the present invention. Further, other additives and agents conventionally utilized in forming roofing membranes may be utilized in the composition of the present invention. Also, the heat-seamable, flat sheet materials of the present invention may be utilized in other areas as well as roofing construction.

What is claimed is:

1. A substituted polybutadiene comprising the following groups:

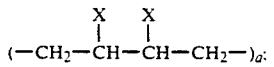 (a)

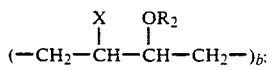 (b)

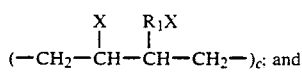 (c) and

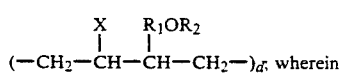 (d) wherein $R_1$ is a ring-opened, cyclic ether having about 3 to about 15 carbon atoms, inclusive;
X is a halogen; and
$R_2$ is an aliphatic group having a carbon chain length of between 6 and 18 carbon atoms, inclusive; and
a = 0.05 to 0.95 mole fraction;
b = 0.01 to 0.75 mole fraction;
c = 0.01 to 0.95 mole fraction;
d = 0.01 to 0.30 mole fraction; and
a + b + c + d = 1.00

2. A substituted polybutadiene in accordance with claim 1 wherein said polybutadiene is 1,4-polybutadiene.

3. A substituted polybutadiene in accordance with claim 2 wherein a = 0.30 to 0.35 mole fraction;
b = 0.025 to 0.055 mole fraction;
c = 0.50 to 0.60 mole fraction;
d = 0.05 to 0.10 mole fraction; and a + b + c + d = 1.00.

4. A substituted polybutadiene in accordance with claim 3 wherein the ring-opened, cyclic ether $R_1$ is $$O-(CH_2)_4.$$

5. A substituted polybutadiene in accordance with claim 4 wherein $R_2$ is an aliphatic group having a carbon chain length of between 6 and 9 carbon atoms and wherein X is chlorine.

6. A composition comprising:
(a) a substituted polybutadiene, said polybutadiene comprising the following groups:

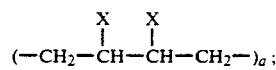 (i)

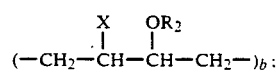 (ii)

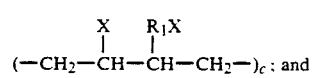 (iii)

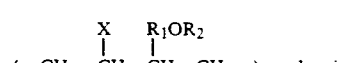 (iv) wherein $R_1$ is a ring-opened cyclic ether having about 3 to about 15 carbon atoms, inclusive;
X is a halogen;
$R_2$ is an aliphatic group having a carbon chain length of between
6 and 18 carbon atoms, inclusive; and
a = 0.05 to 0.95 mole fraction;
b = 0.01 to 0.75 mole fraction;
c = 0.01 to 0.95 mole fraction;
d = 0.01 to 0.30 mole fraction; and
a + b + c + d = 1.00; and
(b) from 5 to 160 parts by weight of a filler material per parts polymer.

7. A composition in accordance with claim 6 wherein
a = 0.30 to 0.35 mole fraction;
b = 0.025 to 0.055 mole fraction;
c = 0.50 to 0.60 mole fraction;
d = 0.05 to 0.10 mole fraction; and a + b + c + d = 1.00.

8. A composition in accordance with claim 7 wherein the ring-opened, cyclic ether $R_1$ is $$O-(CH_2)_4.$$

9. A composition in accordance with claim 8 wherein $R_2$ is an aliphatic group having a carbon chain length of between 6 and 9 carbon atoms and X is chlorine.

10. A composition in accordance with claim 9 wherein said filler material is between 50 and 135 parts by weight per 100 parts polymer.

11. A composition in accordance with claim 10 wherein said filler is selected from the group consisting of titanium dioxide, carbon black, ground coal, ground mollusk shells, calcium carbonate, mica, talc and silica.

12. A composition in accordance with claim wherein said filler is titanium dioxide.

13. A heat-seamable, flat sheet material comprising:
(a) a substituted polybutadiene, said polybutadiene comprising the following groups:

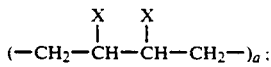  (i)

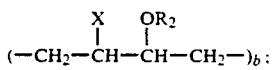  (ii)

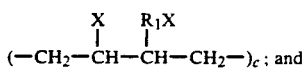  (iii)

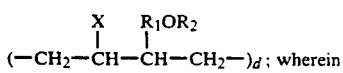  (iv)

X is a halogen;

$R_1$ is a ring-opened cyclic ether having about 3 to about 15 carbon atoms, inclusive;

$R_2$ is an aliphatic group having a carbon chain length of between 6 and 18 carbon atoms, inclusive; and a=0.05 to 0.95 mole fraction;
b=0.01 to 0.75 mole fraction;
c=0.01 to 0.95 mole fraction;
d=0.01 to 0.30 mole fraction; and
a+b+c+d=1.00; and (b) from 5 to 160 parts by weight of a filler material per parts polymer.

14. A heat-seamable, flat sheet material in accordance with claim 13 wherein the ring-opened, cyclic ether $R_1$ is $O—(CH_2)_4$.

15. A material in accordance with claim 14 wherein said material is a roofing membrane.

* * * * *